United States Patent
Michi et al.

(10) Patent No.: US 7,706,954 B2
(45) Date of Patent: *Apr. 27, 2010

(54) SPEED CONTROLLER HAVING SEVERAL OPERATING MODES

(75) Inventors: Harald Michi, Oelbronn-Duerrn (DE); Michael Scherl, Asperg (DE); Michael Weilkes, Sachsenheim (DE); Werner Uhler, Bruchsal (DE)

(73) Assignee: Robert Bosch GmbH, Stuttgart (DE)

( * ) Notice: Subject to any disclaimer, the term of this patent is extended or adjusted under 35 U.S.C. 154(b) by 13 days.

This patent is subject to a terminal disclaimer.

(21) Appl. No.: 10/767,087

(22) Filed: Jan. 29, 2004

(65) Prior Publication Data

US 2005/0004742 A1    Jan. 6, 2005

(30) Foreign Application Priority Data

Jan. 30, 2003 (DE) ................ 103 03 611

(51) Int. Cl.
*G06F 19/00* (2006.01)
*B60T 8/32* (2006.01)

(52) U.S. Cl. .................. 701/96; 701/93; 180/170; 340/903

(58) Field of Classification Search .......... 707/93, 707/96; 340/903, 435, 425.5, 436; 180/170, 180/169, 171
See application file for complete search history.

(56) References Cited

U.S. PATENT DOCUMENTS

| 5,477,457 | A | * | 12/1995 | Okada | 701/37 |
| 6,076,622 | A | * | 6/2000 | Chakraborty et al. | 180/169 |
| 6,226,570 | B1 | * | 5/2001 | Hahn | 701/1 |
| 6,658,344 | B2 | * | 12/2003 | Hirasago | 701/96 |
| 7,321,818 | B2 | * | 1/2008 | Michi et al. | 701/96 |
| 2002/0101337 | A1 | * | 8/2002 | Igaki et al. | 340/436 |
| 2004/0084237 | A1 | * | 5/2004 | Petrie, Jr. | 180/170 |

FOREIGN PATENT DOCUMENTS

| EP | 1065087 | 1/2001 |
| EP | 1065090 | 1/2001 |

* cited by examiner

*Primary Examiner*—Khoi H. Tran
*Assistant Examiner*—Ronnie Mancho
(74) *Attorney, Agent, or Firm*—Kenyon & Kenyon LLP

(57) ABSTRACT

A speed controller for motor vehicles having an input device for the input of a desired speed $V_{set}$ by the driver, and having a plurality of operating modes which are able to be activated in different speed ranges and differ in their functional scope. A change in the operating mode, which results in the loss of a safety-relevant function, is provided or enabled by a command of the driver, characterized by a decision unit, which, in the light of predefined criteria, determines whether a change in the desired speed $V_{set}$, which is input by the driver, is to be interpreted as a command for changing the operating mode.

10 Claims, 2 Drawing Sheets

SPEED CONTROLLER HAVING SEVERAL OPERATING MODES

FIELD OF THE INVENTION

The present invention relates to a speed controller for motor vehicles.

BACKGROUND INFORMATION

German Published Patent Application No. 199 58 120 refers to a speed controller that is operable in a so-called ACC mode (adaptive cruise control), and in a stop and go mode.

In the ACC mode, the speed of the vehicle is regulated to a desired speed selected by the driver, provided the roadway ahead of his own vehicle is clear. A distance gap sensor, such as a radar sensor, permits detecting vehicles traveling ahead on his own traffic lane and other obstacles, and adjusting speed, if necessary, in such a way that the immediately preceding vehicle is followed at an appropriate safety distance. The ACC mode is provided, in general, for travel on express highways or well developed highways having flowing traffic, and also for traffic situations characterized by relatively low dynamics and relatively large vehicle separations. Under these conditions, a long-range tracking radar, having comparatively low depth resolution, is sufficient for recording the traffic surroundings. The relative speed of the tracked object is directly measurable with the aid of the Doppler effect. In order to avoid frequent faulty reactions of the system, only moving radar objects are generally considered as relevant target objects, since, in general, it is not to be expected that there are standing objects on the roadway. However, in traffic situations having greater dynamics, such as in slow-moving traffic or stop and go traffic, or even in city traffic, standing targets should also be included in the evaluation. Moreover, in this case, because of the generally shorter vehicle separations, a more detailed detection and evaluation of the traffic situation is also desirable. The ACC mode is unsuitable for these traffic situations and is therefore only able to be activated when the speed of one's own vehicle is above a certain limiting speed, such as above 30 km/h.

Alternatively, the stop and go mode is provided for the lower speed range and affords functions that are not available in the ACC mode, in particular the function of braking one's own vehicle to a standstill, such as when driving upon a traffic jam. Under certain circumstances an automatic restart-up is then also possible, when the preceding vehicle is also set in motion again. These conditions are satisfied, for example, when one's own vehicle has stood still for a relatively short time, and when the target object followed up to the present, that is, the preceding vehicle, has constantly remained in the tracking range of the distance sensor. On the other hand, under other conditions, it may be expedient to deactivate the system altogether, or simply to have it emit a start-up prompt to the driver when the preceding vehicle starts up, and to leave the last decision up to him. For an expanded functionality in the stop and go mode, not only is the detection of standing targets required, but in general an additional close-range sensor system is also desirable, such as in the form of a video system having electronic image evaluation, a close-range radar or a light-optical distance sensor for the close range including the left and right roadway edges, so that suddenly-appearing obstacles may also be detected in time. This more complex detection and evaluation of the traffic environment, which may be required in the stop and go mode, can lead, at high speeds, to faulty reactions or to an overload of the system. For this reason, the stop and go mode is typically only activatable at speeds up to an upper limiting speed, such as up to 40 km/h.

In the overlapping zone between the speed ranges for ACC and Stop and Go modes, that is, in the exemplary systems described, between 30 and 40 km/h, both modes can be activated and the selection of the mode is left to the driver. Special mode selection keys are provided in the known system for selecting the operating mode, using which, the driver is able to activate either the ACC mode or the Stop & Go mode. The active participation of the driver in the selection of the operating mode is regarded as efficacious, because in this way it is made clear to the driver in which mode the system happens to be, and which functions of the speed controller are available. Thus, if the preceding vehicle suddenly stops, and the driver mistakenly assumes that the speed controller is in the Stop & Go mode and relies on the speed controller automatic braking to a standstill may be prevented. However, some drivers feel that the necessity of having to select the operating modes themselves is an impairment of their operating convenience, and that the command keys needed for this purpose make the operating system more involved and complex.

SUMMARY OF THE INVENTION

The speed controller according to the present invention may have the advantage of greater operating convenience, clarity and plausibility of the operating system when consideration is given to safety aspects.

According to an exemplary embodiment of the present invention, the speed controller simultaneously interprets commands that allow the driver to increase or decrease the desired speed as commands for changing the operating mode under appropriate conditions. Consequently, special command keys for the selection of the operating mode may be omitted. The driver remains a participant in the selection of the mode, by way of the input of the desired speed, so that the transparency of the system remains observable to the driver. A mode change, which is connected not to a restriction, but rather to a broadening of the scope of the functions of the speed controller, does not require any increased attention of the driver, and can therefore also be introduced automatically, without participation of the driver. If, on the other hand, the mode change has the effect of making a safety-relevant function no longer available, then the driver should be made aware of this so that he does not mistakenly rely on this function. However, if the driver actively selects a speed which is clearly outside the speed range permitted for the current mode, then it will be clear to the driver that the current mode cannot be maintained, and therefore the selection of this desired speed indicates that the driver consciously wants to assume a greater responsibility, so that the input of an additional command to change the operating mode is unnecessary.

In order to increase transparency, the driver may be made aware by a suitable signal, such as an optical or an acoustical signal, that a mode change has taken place, and in which mode the speed controller currently is to be found.

In one embodiment, the speed controller has only two main operating modes, namely an ACC mode and a mode designated here as "Stop & Roll". The concept "Stop & Roll" refers to a mode which lies somewhere between the ACC mode and the Stop & Go mode, discussed above, with respect to the sensor system required and the complexity in the evaluation of the traffic environment. In the Stop & Roll mode, as in the Stop & Go mode, automatic braking of the vehicle to a standstill is possible, but, because of the restricted sensor technology, this mode is not intended for highly dynamic traffic situations such as occur, for instance, in city traffic.

In order to avoid frequent mode changes, the changeover as a function of the desired speed selected by the driver may take place with a certain hysteresis. Thereby, the speed controller may remain in the current mode if the desired speed selected lies within the overlap range in which both operating modes are permitted.

Since the actual speed of the vehicle does not always correspond to the desired speed set by the driver, the actual speed of the vehicle should also be drawn upon as a criterion for a mode change. In this case, the actual speed may be regarded as the speed indicated to the driver on the tachometer. It is believed that it also may be advantageous if the criterion "actual speed" is also handled flexibly, in the sense that short-lived undershooting of the Stop & Roll switchover speed may be tolerated with the aid of a timer. Thus, the driver has the opportunity to input a higher desired speed prospectively in the Stop & Roll operation, and thereby (implicitly) to give the command to change into ACC mode, when it is recognized that traffic is decreasing. Normally, the vehicle will then accelerate within a short time to a speed at which ACC operation is permissible. When the minimum speed for ACC is not reached within a threshold time span such as 5 seconds, the system may automatically relapse into Stop & Roll mode again.

If the desired speed that is set is greater than the limiting speed for ACC, but the actual speed of the vehicle falls below this value on account of the traffic, and remains below this value for a certain time, a switchover may automatically take place into the Stop & Roll mode. In this case, the desired speed is limited automatically to the greatest value permissible for Stop & Roll. Then, to return into the ACC mode, a driver-initiated action may be required, such as the input of a higher desired speed.

In both main operation modes an override by operating the gas pedal is possible. The acceleration request input by the driver on the gas pedal then has precedence over a lower setpoint acceleration calculated by the speed controller. Even in these override situations, a change between the two main modes is possible, but a change from Stop & Roll to ACC mode may be permitted only when the driver actively raises the desired speed. Otherwise, the speed controller may be deactivated if the actual speed reaches a threshold value, at which the functions of the Stop & Roll operation are no longer maintained.

When the speed controller has been deactivated, it can be reactivated by the input of a desired speed. A decision may follow as to which of the ACC mode or the Stop & Roll mode is to be activated, as a function of whether the actual speed lies above or below the limiting speed for ACC.

In one exemplary embodiment, the decision regarding a mode change and/or regarding the activation or deactivation of an operating mode can also be a function of whether certain conditions with respect to the recording of the traffic environment are satisfied, so that an ever greater operating safety is achieved.

DETAILED DESCRIPTION

Figure 1:
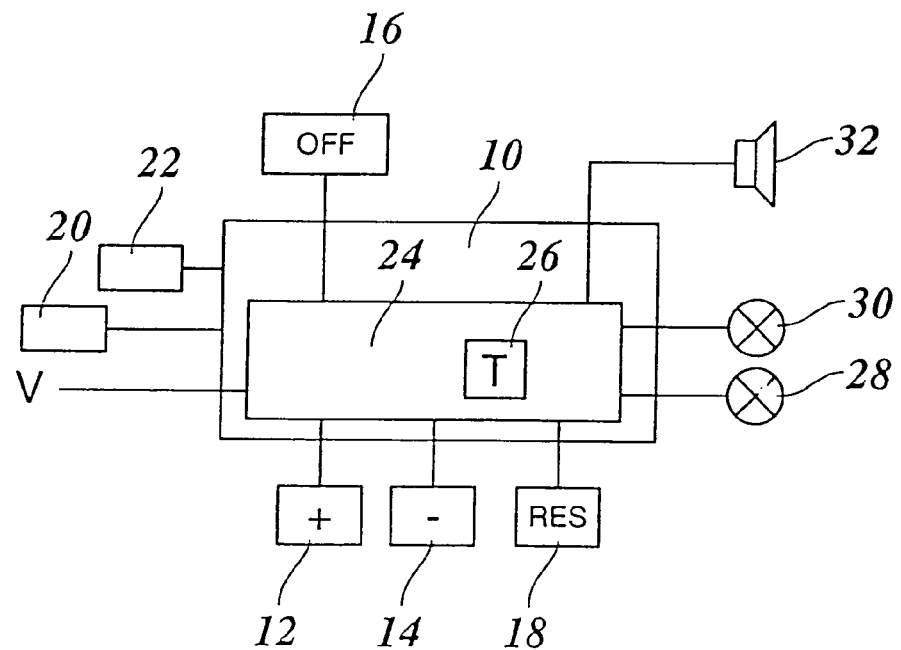
FIG. 1 shows a block diagram of a speed controller according to an exemplary embodiment of the present invention.

FIG. 1 shows a speed controller 10 by which the speed of a motor vehicle is controlled to a desired speed selected by the driver. To operate speed controller 10, a multifunctional lever may be provided on the steering wheel, which fulfills the functions of several function keys, which may include: a "+" key 12 to activate the control and for raising the desired speed $V_{set}$, for example, in steps of 10 km/h; a "−" key 14 for activating the controller and for reducing desired speed $V_{set}$; an OFF key 16 for deactivating the controller and a resume key 18 for renewed activation of the controller and setting the desired speed prevailing before the last deactivation. In response to the first activation of the controller with the aid of the "+" key or "−" key, the actual speed V of the vehicle rounded up or down in tens (e.g., 30, 40, 50) can be taken to be the desired speed $V_{set}$ of the vehicle, just as it is displayed on the tachometer. When resume key 18 is pressed, without a desired speed having been stored, for the determination of the desired speed there is a rounding to the whole ten that is closest to the actual speed.

Speed controller 10 receives signals from a long range distance sensor 20, such as a long range radar and from a short range sensor system 22, which is formed, for example, by a short range radar, a light-optical distance sensor system, a video system and the like. When the sensor system detects a preceding vehicle traveling in one's own lane, the speed of the vehicle may be reduced to below the set desired speed, so that the preceding vehicle may be followed at an appropriate safety distance, for example, at a selectable time gap of 1 to 2 seconds. In an ACC operating mode, the spacing regulation takes place exclusively with the aid of signals of long range distance sensor 20, which has a locating range such as 10 to 200 m. This operating mode is provided for travel on express highways and highways for traffic situations in which, in general, people travel at relatively high speeds. In addition, speed controller 10 has a controller mode which is designated as Stop & Roll and is provided for traffic situations having high traffic density and correspondingly low speed, such as for slow-moving traffic or traffic jam operation on express highways and highways. In this mode, signals of the short range sensor system 22 are also evaluated, so that shorter vehicle spacing may be detected more accurately. Whereas in the ACC mode only movable objects are considered as relevant target objects, in the Stop & Roll mode other standing targets that are detected by long range distance sensor 20 or by close range sensor system 22 are also evaluated. In addition, close range sensor system 22 also has a greater locating angular range, so that objects which are located in close range on neighboring lanes or at the edge of the roadway can also be detected. In this manner, the system enables reactions in time to suddenly appearing obstacles, such as vehicles suddenly swinging in from the side lane.

The Stop & Roll mode has at least one controlling function which is not available in the ACC mode, in particular, a stop function by which the vehicle may be automatically braked to a standstill upon approaching a standing obstacle.

The control functions in the two operating modes ACC and Stop & Roll are known to those of ordinary skill in the art, and are therefore not described here in greater detail.

Speed controller 10 has a decision unit 24 which, in dependence upon the respective traffic situation and with the collaboration of the driver, determines in which operating mode the speed controller is working. The criteria for these determinations is explained in more detail below. Speed controller 24 also includes one or more integrated timers 26, which are used in the connection with the determination processes.

If decision unit 24 has selected the ACC mode, this is indicated to the driver by the lighting up of an indicator light 28 on the dashboard. Correspondingly, an indicator light 30 indicates the operating mode Stop & Roll. In addition, a loudspeaker 32 is provided, via which the driver is made aware of a change in the operating mode by an acoustical signal, or may even be warned of certain system states or traffic situations.

Figure 2:
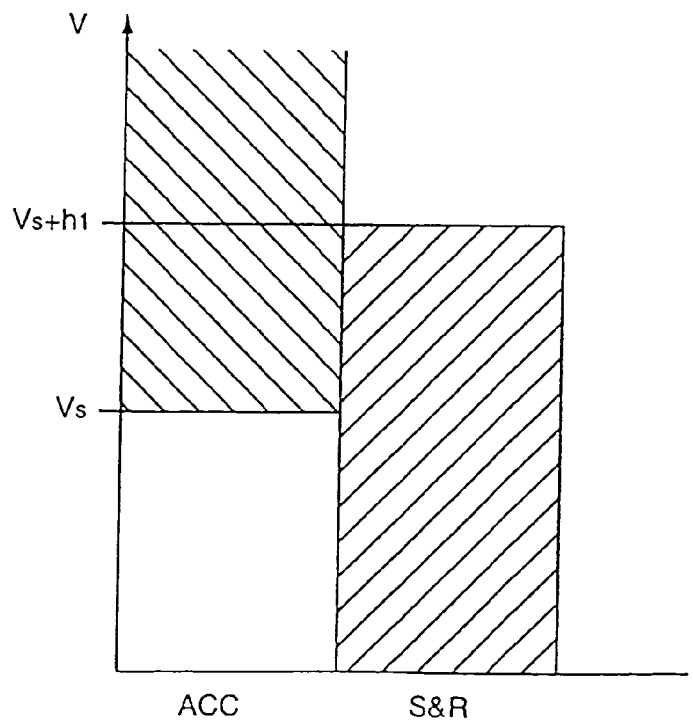
FIG. 2 shows a diagram of exemplary speed ranges at which the various operating modes of the speed controller may be activated.

In FIG. 2, exemplary speed ranges are shown, in which the operating modes ACC and Stop & Roll (S&R) may be activated. As shown, the ACC mode can be activated when the actual speed V of the vehicle is greater than a limiting speed $V_s$. The S&R mode can be activated when the actual speed of the vehicle is lower than a speed $V_s+h_1$. The speed range between $V_s$ and $V_s+h_1$ is consequently a hysteresis range, in which either the ACC mode or the S&R mode may be active. As an example, let us assume that the limiting speed $V_s$ is 30 km/h and that the hysteresis interval $h_1$ is 5 km/h.

Figure 3:
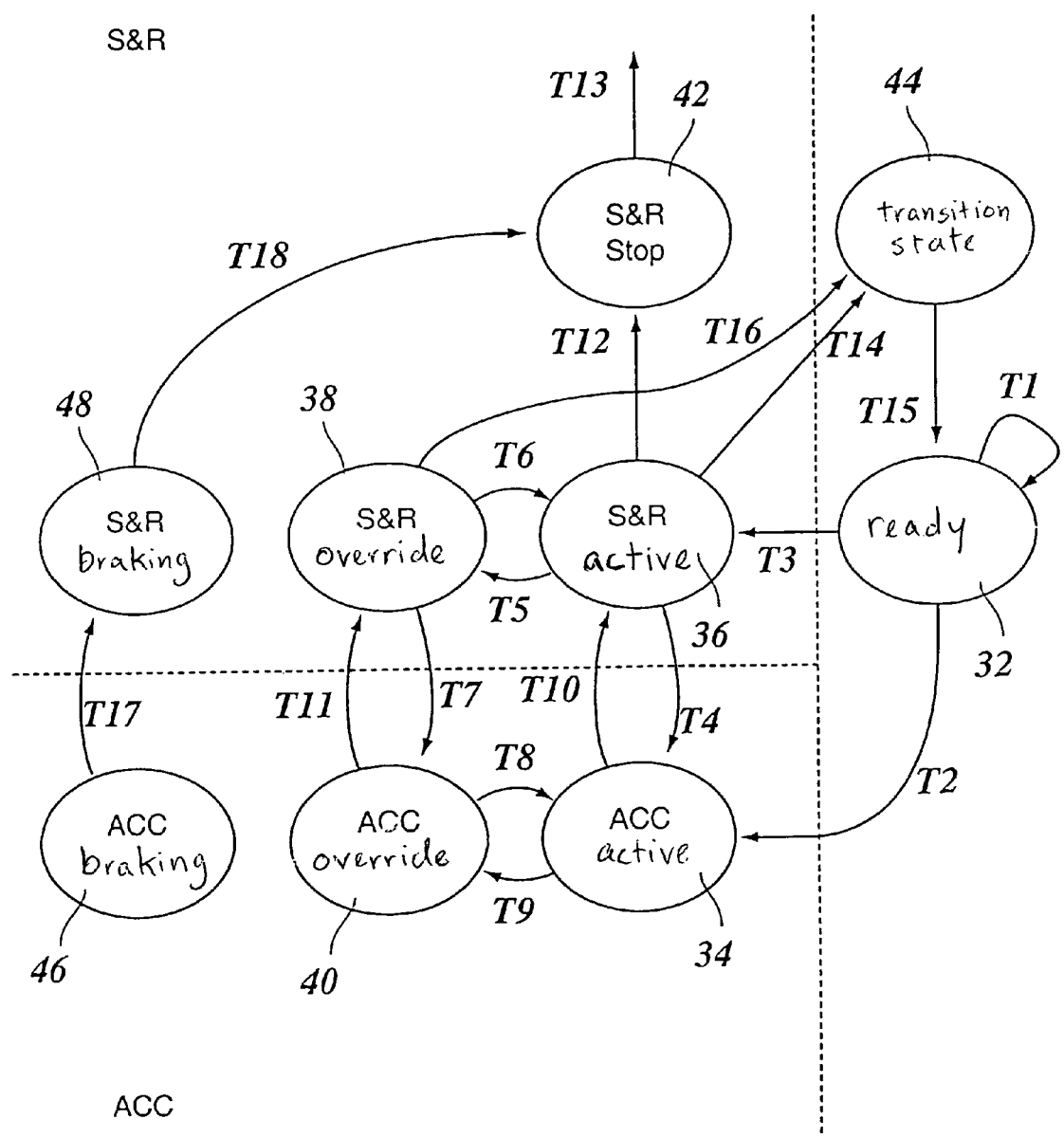
FIG. 3 shows a diagram depicting exemplary transitions between the various main operating modes and associated conditions of the speed controller.

FIG. 3 shows the various operating states of the speed controller as well as significant transitions between the operating states. The active operating states are divided into the main operating modes ACC and S&R.

In a state 32 referred to as "readiness", the sensor systems and the evaluation and control algorithms of speed controller 10 are active, so that the traffic events can be followed, but no control commands are given to the driving or the braking system of the vehicle and control over the vehicle remains with the driver. So long as the driver does not actively input a command to activate the speed controller, the speed controller remains in the readiness state, as is symbolized by an arrow T1.

The driver can activate the speed controller by operating "+" key 12, "−" key 14 or resume key 18. Decision unit 24 then determines, in the light of the present actual speed V, whether the speed controller is changing into state 34 "ACC active" or state 36 "S&R active". If actual speed V is greater than limiting speed $V_s$, then, upon the activation of each of the three keys 12, 14, 18, transition into state 34 "ACC active" corresponding to arrow T2 in FIG. 3 takes place. If, on the other hand, actual speed V is less than or equal to $V_s$, transition into state 36 "S&R active" takes place according to arrow T3. In this case, the desired speed is set to $V_s$, provided that the desired speed set by operating keys 12, 14 and 18 is greater than this value. As a result, the ACC mode can be activated only when the speed of the vehicle is at least 30 km/h. Otherwise, the controller goes into S&R mode, and the vehicle speed is limited to the range of 1 to 30 km/h, that is, to the range in which a flawless functioning of the S&R mode is ensured.

In state 36, the driver has two possibilities of accelerating the vehicle to above 30 km/h and of going over into ACC mode. Firstly, the driver can select a greater desired speed by single or multiple operation of "+" key 12. As soon as the new desired speed $V_{set}$ is greater than $V_s+h_1$, that is, at least 40 km/h, decision unit 24 causes a transition into state 34, as shown by arrow T4. Alternatively, the driver may operate the gas pedal in state 36, and thus override the S&R control function, so that, according to arrow T5, the controller goes over into state 38, "override S&R". After the vehicle has been accelerated to the desired speed, and the driver lets up the gas pedal, the controller returns to state 36 "S&R active", according to arrow T6. If a desired speed $V_{set}$ is then selected by operating "+" key 12 or "−" key 14, that is greater than $V_s+h_1$, the controller goes to state 34 via arrow T4. The driver may also be able to select a desired speed $V_{set}$ that is greater than $V_s+h_1$, even while he holds down the gas pedal and thus is in state 38, by operating the "+" key or the "−" key. Then, as soon as the actual speed V is greater than $V_s+h_1$, there is a transition to state 40 "override ACC", according to arrow T7. If the driver now lets up the gas pedal, according to arrow T8, transition takes place into state 34 "ACC active". The speed of the vehicle is then controlled to the newly selected desired speed $V_{set}$, and the actual speed will also remain above 30 km/h, since the speed was at least 35 km/h when the gas pedal was let up.

As can be discerned from the description above, the driver operates at least once "+" key 12 or "−" key 14 (or resume key 18), to reach the ACC mode (state 34) from the S&R mode (state 36). As a result, this mode change does not take place without the active participation of the driver, and consequently does not occur against the will of the driver.

The driver may override state 34 "ACC active" by operating the gas pedal, so that he temporarily reaches state 40, according to arrow T9.

Arrow T10 in FIG. 3 describes the regular transition from ACC mode into S&R mode, or, more accurately, the transition from state 34 into state 36. This transition is possible when one of the following conditions is satisfied:

a) The desired speed $V_{set}$ is lower than limiting speed $V_s$, and in addition, the actual speed V is lower than $V_s+h_1$. This corresponds to the situation in which the driver selects a low desired speed by operating "−" key 14. The vehicle will then slow down, and the transition into S&R mode takes place as soon as the speed range provided for this mode is reached, according to FIG. 2.

b) Actual speed V decreases from a value above limiting speed $V_s$ to a value below this limiting speed. This is typically the case when, upon driving up to the end of a traffic congestion, long-range distance sensor 20 detects a slow or stopped vehicle in its own lane, and accordingly throttles the speed. The transition into the S&R mode then takes place as soon as the speed region permissible for the ACC mode is exited. In this case, the desired speed $V_{set}$ is automatically set to $V_s$ in order to ensure that the speed controller, when the congestion has lifted, does not return again by itself to the ACC mode, but only occurs when the driver actively raises the desired speed again, corresponding to a transition according to arrow T4. The transition from ACC to S&R may also be restricted to take place when $V_s$ is undershot for the duration of a certain time interval. This achieves a certain tolerance against noise in the speed signal.

c) desired speed $V_{set}$ is raised by driver command to a value which is greater than $V_s+h_1$, and, in addition, after the expiration of a time span measured by timer 26, actual speed V is still lower than $V_s$. This corresponds to the situation in which the driver, according to arrow T4, wishes to change into ACC mode, but the limiting speed $V_s$ that is required for this mode cannot be achieved within an appropriate time span such as 5 seconds, for instance, because there is a slower preceding vehicle in front of the driver's vehicle. In this case, the speed controller automatically returns to state 36 again, after the expiration of the time span mentioned. In order to reach state 34, the driver must then once again input a command to increase the desired speed as soon as the lane ahead of him is free.

In exceptional cases, a transition from state 40 "override ACC" into state 38 "override S&R" is also possible, as indicated by arrow T11. This transition takes place when the driver lowers the desired speed to a value below $V_s$, and the actual speed V decreases to below $V_s$ in spite of the operation of the gas pedal, i.e. when the driver decreases the desired speed, but then, by operating the gas pedal, assures that the vehicle decelerates slower than is specified by the speed controller.

From state 36 "S&R active" a transition into a state 42 "S&R stop" is also possible, as symbolized by arrow T12. In state 42, speed controller 10 causes the automatic braking of the vehicle to a standstill. Subsequently, the speed controller, according to arrow T13, goes over into one of several start-up states which determine whether the renewed starting up of the vehicle is controlled by speed controller 10, if traffic conditions permit it, or when the driver confirms a corresponding start-up request, or whether the start-up procedure is controlled by the driver himself. Details of these start-up procedures are described in German Published Patent Application No. 199 58 520.

The transition into state 42 according to arrow T12 takes place when, in state 36, the speed of the vehicle (the determining factor here is not the indicated but the actually measured speed) has decreased to below a threshold value such as 4 km/h, e.g., when approaching a standing obstacle. Since this function "braking to a standstill" is only available in the S&R mode, the transition from the S&R mode into the ACC mode, and thus the renouncement of this function, is only permitted when the driver inputs a corresponding command by active operation of one of keys 12, 14 or 18.

In each of the active states, speed controller 10 can be inactivated if one of several predefined events occurs. The most important of these events are the operation of OFF key 16 by the driver and the operation of the brake pedal by the driver. In FIG. 3, deactivation from state 36 "S&R active" is shown by an arrow T14. The speed controller then runs through a transition state 44, in which the control commands given out to the drive and/or brake system are gradually driven back, so that a jerk-free transition and a correspondingly great riding comfort is achieved. From transition state 44, the speed controller then goes into state 32 "readiness" again, according to arrow T15. The desired speed prevailing before the deactivation remains stored, however, and is called up again when the driver operates resume key 18 in state 32. An exception may optionally be provided for the case in which the stored desired speed is greater than limiting speed $V_s$, and at operation of resume key 18 the actual speed of the vehicle is less than $V_s$. In that case there is then a transition into S&R mode, and the desired speed is set to $V_s$, as was described in connection with arrow T3. This takes into account the possibility that the driver, after a protracted inactive phase of the speed controller, has forgotten that he was last in ACC mode, in which the function "brake to standstill" is not available.

As was described in connection with arrow T7, a transition from state 38 "override S&R" into state 40 "override ACC" takes place only when the driver increases the desired speed which was prevalent up to now in the S&R mode. If the desired speed remains unchanged, and the driver accelerates by operating the gas pedal, it can therefore happen that the speed becomes greater than the speed permissible for the Stop & Roll mode. In this case the speed controller is compulsorily deactivated, as is symbolized by arrow T16. This deactivation takes place under condition that desired speed $V_{set}$ is less than or equal to $V_s$, and that, in addition, actual speed V is greater than a threshold value $V_s+h_2$. Here $h_2$ is a hysteresis parameter which may be the same as $h_1$.

In FIG. 3, still two further states 46 "ACC braking" and 48 "S&R braking" are shown, in which the speed controller can only act upon the braking system of the vehicle, but not upon the drive system. These states are reached when the parking brake is operated in the ACC mode (state 34) or in the S&R mode (state 36), or when in these modes the electronic stability program (ESP) of the vehicle detects a lane condition having low frictional connection (e.g. an icy road). A transition is in that case only possible in the direction from an ACC mode into the S&R mode, that is from state 46 into state 48, according to arrow T17, when the actual speed V is lower than $V_s$. From state 48 braking to a standstill is possible again (via arrow T18).

Whereas in the exemplary embodiment described here the desired speed can only be changed in intervals of 10 km/h, this was for illustrative purposes only and the desired speed may also be changed gradually or in smaller increments, such as at intervals of 1 km/h.

The conditions for the change between modes ACC and S&R are summarized once more in the following Table 1.

TABLE 1

| | Activation ACC |
|---|---|
| T2 | V > Vs AND (+, − OR resume operated)  Activation S&R |
| T3 | V ≦ Vs AND (+, − OR resume operated)  ($V_{set}$ is limited to $V_s$)  S&R after ACC |
| T4 | $V_{set} > V_s + h_1$ |
| T7 | $V_{set} > V_s + h_1$ AND $V > V_s + h_1$  ACC after S&R |
| T10 | ($V_{set} < V_s$ AND $V < V_s + h_1$) OR  (V decreases below Vs) OR  ($V_{set} > V_s + h_1$ AND $V < V_s$  AND timer expired) |
| T11 | $V_{set} < V_s$ AND $V < V_s$  Deactivation S&R |
| T16 | $V_{set} \leqq V_s$ AND $V > V_s + h_2$ |

In a second exemplary embodiment of the speed controller, other conditions may apply to the transitions between the states shown in FIG. 3. For the definition of these conditions, parameters are used which are stored in decision unit 24, and which are specified as follows:

Threshold value for the switchover between ACC and S&R $V_{select}$=35 km/h

Maximum desired speed for S&R:

$V_{SRset}$=30 km/h.

Minimum speed (limiting speed) for ACC:

$V_{ACCmin}$=30 km/h

Threshold value for devaluating S&R when overriding $V_{SRs}$=45 km/h

Maximum vehicle distance for activating S&R:

$d_{SRon}$=30 m

Maximum vehicle distance for deactivating S&R:

$d_{SRoff}$=50 m

Waiting time when target object is lost:

$T_1$=5 s

The conditions for activating and deactivating the operating modes ACC and A&R, and for the change of mode are listed in the following Table 2.

TABLE 2

| | Activation ACC |
|---|---|
| T2 | $V > V_{select}$ AND (+ OR − operated OR (resume operated AND $V_{set\,(slt)} > V_s$)) Activation S&R |
| T3 | $V = V_{select}$ AND (+, − OR resume operated) AND d < $d_{SRon}$ (is limited to $V_{SRset}$) S&R after ACC |
| T4 | $V > V_{select}$ AND $V_{set} > V_{select}$ |
| T7 | $V_{SRs} \geq V > V_{select}$ AND $V_{set} > V_{select}$ ACC after S&R |
| T10 | V decreases to under $V_{ACCmin}$ Deactivation S&R |
| T14 | t > T1 OR d > $d_{SRoff}$ OR ($V > V_{SRs}$ AND (none of keys +, − OR resume is operated)) |
| T16 | $V > V_{SRs}$ AND (none of keys +, − OR resume is operated) |

The ACC mode is activated (arrow T2) when actual speed V is greater than limiting speed $V_{select}$, and, in addition, the driver operates "+" key 12 or the "−" key. The operation of resume key 18, by which the last stored desired speed is reestablished, only effects the activation of the ACC mode if the last stored desired speed $V_{set(alt)}$ is greater than $V_{select}$.

Mode S&R is activated (arrow T3) when actual speed V is at most equal to $V_{select}$, and the driver operates a key 12, 14 or 18. However, in addition, in this exemplary embodiment the condition that the sensor system has detected a target object, and the distance of the target object is at most equal to $d_{SRon}$, that is, at most 30 m must also be satisfied. As a result, the Stop & Roll can only be activated when a target object, such as a vehicle traveling ahead, is available at a distance that is not too great so that the actions of the speed controller are determined by the behavior of the preceding vehicle. By this, faulty reactions are avoided that come about when a relevant target object has not been recognized by the distance sensor system.

Upon activation of the S&R mode, desired speed $V_{set}$ is limited in this example to speed $V_{SRset}$ (30 km/h).

A change from state 36 "S&R active" into state 34 "ACC active" according to arrow T4, occurs in this exemplary embodiment when actual speed V is greater than $V_{select}$, and, in addition, a desired speed is selected by operating one of keys 12, 14, 18, which is greater than $V_{select}$.

A change from state 38 "override S&R" into state 40 "override ACC" (arrow T7) takes place only when actual speed V is greater than $V_{select}$ (35 km/h) but less than threshold value $V_{SRs}$ (45 km/h), and, in addition, the desired speed is set to a greater value than $V_{select}$ by operating one of keys 12, 14, 18. As a result, in order to get into the ACC mode by operating the gas pedal, the driver has to operate one of keys 12, 14, 18 while the speed is in the interval between 35 and 45 km/h. Thereby, the driver is made aware that he is now leaving the S&R mode, in which the function "braking to a standstill" is available. If the driver misses or deliberately omits operating one of the keys in this speed interval, the behavior of decision unit 24 depends on actual speed V. If this remains less than 45 km/h, the system returns to state 36 (arrow T6) until the driver lets go of the gas pedal. Otherwise, the speed controller is deactivated (arrow T16).

The transition from state 34 "ACC active" to state 36 "S&R active" takes place automatically as soon as actual speed V decreases to below the minimum speed $V_{ACCmin}$ for the ACC mode (arrow T10).

A transition from state 40 "override ACC" to state 38 (override S&R), corresponding to arrow T11 in the previous exemplary embodiment is not provided in this specific embodiment. If the speed of the vehicle decreases to below the minimum speed for ACC while the driver operates the pedal, such as when driving on steep hills, and the driver then lets go of the gas pedal, the transition into state 36 "S&R active" takes place via state 34 (arrows T8 and T10). However, if the driver accelerates again, so that the speed increases above $V_{ACCmin}$ again before the driver lets go of the gas pedal, the system remains in the ACC mode. This will generally also correspond to the expectation of the driver.

When the speed controller is in state 36 "S&R active", a deactivation takes place according to arrow T14 in this specific embodiment, not only by operating off key 16, but also automatically when one of the following conditions is fulfilled:

a) The target object followed up to now gets lost and is also not found again before time t, counted by timer 26, reaches the value $T_1$ (5 s).
b) The distance d of the preceding vehicle becomes greater than the parameter $d_{SRoff}$ (50 m)
c) The current speed becomes greater than the threshold value $V_{SRs}$ (45 km/h), for example, during steep downhill driving, and the driver does not operate any of the keys 12, 14 or 18.

By checking these conditions it is ensured that the S&R mode is active only when the speed controller is also able safely to fulfill the functions provided in this mode.

What is claimed is:

1. A speed controller for a motor vehicle, comprising:
an input device configured to receive input of a desired speed by a driver, wherein a plurality of operating modes differing in functional scope are provided by the speed controller, which operating modes are configured to be activated in different speed ranges, each operating mode having a corresponding number of speed-regulating functions; and
a decision unit configured to determine, using predefined criteria, whether a change in the desired speed input by the driver is to be interpreted as a command for changing the current operating mode;
wherein a first of the plurality of operating modes is an operating mode for a first predetermined vehicle speed range that is configured to be activated only above a limiting speed $V_s$, and a second of the plurality of operating modes is configured for a second predetermined vehicle speed range, wherein a lower limit of the first predetermined vehicle speed range is equal to the limiting speed $V_s$, and wherein a lower limit of the second predetermined vehicle speed range is lower than the limiting speed $V_s$, and wherein an upper limit of the second predetermined vehicle speed range is greater than the limiting speed $V_s$ and lower than an upper limit of the first predetermined vehicle speed range, and wherein the first predetermined vehicle speed range and the second predetermined vehicle speed range at least partially overlap, and wherein the second operating mode provides in certain instances an automatic braking of the vehicle to a standstill, and wherein the first operating mode does not provide the automatic braking of the vehicle to a standstill;

wherein the decision unit is configured to automatically cause, when the speed of the vehicle decreases to below the limiting speed $V_s$, a change from the first operating mode into second operating mode, and then automatically limit the desired speed to a value permitted in the second operating mode;

wherein the decision unit is configured to cause a change from the second operating mode into the first operating mode only if the driver provides to the input device an input of a desired speed greater than the upper limit of the second predetermined vehicle speed range;

wherein when, in the second operating mode, the driver does not input a new desired speed to the input device and the driver increases the speed of the vehicle by operating a gas pedal of the motor vehicle to exceed a threshold speed equal to the limiting speed plus a predetermined positive value, the decision unit is configured to deactivate the speed controller.

2. The speed controller of claim 1, further comprising:
a display device adapted to display the current operating mode.

3. The speed controller of claim 1, further comprising:
a signal device to signal to the driver a change in the current operating mode.

4. The speed controller of claim 1, wherein the decision unit automatically causes a change from the first operating mode into the second operating mode when the desired speed is lower than the limiting speed $V_s$ and when the actual speed of the vehicle is less than the upper limit of the second predetermined vehicle speed range, the upper limit being equal to $V_s+h_1$, where $h_1$ has a non-negative value.

5. The speed controller of claim 1, wherein the decision unit automatically causes the change from the first operating mode into the second operating mode when one of the following occurs:

a) the desired speed is increased to a threshold value which is at least equal to the limiting speed; and
b) the actual speed of the vehicle does not increase to the limiting speed within a predefined time interval.

6. The speed controller of claim 1, wherein the decision unit deactivates the speed controller when, in the second operating mode, the desired speed is less than or equal to the limiting speed $V_s$ and the actual speed of the vehicle is greater than a threshold value $V_s+h_2$, where $h_2$ has a non-negative value.

7. The speed controller of claim 1, wherein the decision unit activates the speed controller in the first operating mode when, upon the input of the desired speed, the actual speed of the vehicle is greater than the limiting speed and the decision unit activates the speed controller in the second operating mode and limits the desired speed when, upon the input of the desired speed, the actual speed of the vehicle is less than or equal to the limiting speed.

8. The speed controller of claim 7, wherein the decision unit activates the speed controller in the second operating mode only when a target object is located by a distance sensor system and the distance from the vehicle to this target object lies within a predefined range.

9. The speed controller of claim 8, wherein the decision unit automatically deactivates the speed controller in the second operating mode when the target object is lost by the distance sensor system and is not re-detected within a predefined time span.

10. The speed controller of claim 8, wherein the decision unit automatically deactivates the speed controller in the second operating mode when the distance between the vehicle and the target object becomes greater than a predefined value.

* * * * *